(12) United States Patent
Yang et al.

(10) Patent No.: US 12,316,795 B2
(45) Date of Patent: May 27, 2025

(54) MOBILE TERMINAL AND MOBILE DEVICE (71) Applicant: Beijing Xiaomi Mobile Software Co., Ltd., Beijing (CN)

(72) Inventors: Zongbao Yang, Beijing (CN); Wei Liu, Beijing (CN); Yan Zheng, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 430 days.

(21) Appl. No.: 17/752,379

(22) Filed: May 24, 2022

(65) Prior Publication Data

US 2023/0208954 A1 Jun. 29, 2023

(30) Foreign Application Priority Data

Dec. 29, 2021 (CN) .......................... 202111640093.0

(51) Int. Cl.
| | |
|---|---|
| *H04M 1/02* | (2006.01) |
| *H04N 23/51* | (2023.01) |
| *H04N 23/52* | (2023.01) |
| *H04N 23/54* | (2023.01) |
| *H04N 23/55* | (2023.01) |
| *H04N 23/57* | (2023.01) |

(52) U.S. Cl.
CPC ....... *H04M 1/0264* (2013.01); *H04M 1/0249* (2013.01); *H04N 23/51* (2023.01); *H04N 23/52* (2023.01); *H04N 23/54* (2023.01); *H04N 23/55* (2023.01); *H04N 23/57* (2023.01)

(58) Field of Classification Search
CPC ........ H04N 23/51; H04N 23/52; H04N 23/54; H04N 23/55; H04N 23/57; H04M 1/0264; H04M 1/0249; G03B 17/14; G03B 17/565; G03B 30/00; G06F 1/1686; H05K 7/20

See application file for complete search history.

(56) References Cited

U.S. PATENT DOCUMENTS

| | | | |
|---|---|---|---|
| 2007/0092238 A1* | 4/2007 | Shirakata | G03B 17/04 396/72 |
| 2013/0265649 A1* | 10/2013 | Ohashi | G02B 15/1421 359/692 |
| 2018/0167497 A1 | 6/2018 | Pizzo et al. | |
| 2018/0198897 A1* | 7/2018 | Tang | H04N 23/55 |
| 2018/0234595 A1* | 8/2018 | Lim | H04N 23/54 |
| 2018/0317339 A1* | 11/2018 | Evans, V | H05K 7/20127 |
| 2019/0137724 A1* | 5/2019 | Kim | G02B 7/02 |

(Continued)

FOREIGN PATENT DOCUMENTS

CN 214799611 U 11/2021

OTHER PUBLICATIONS

Extended European Search Report issued on Dec. 2, 2022 for European Patent Application No. 22176545.6.

*Primary Examiner* — Twyler L Haskins
*Assistant Examiner* — John H Morehead, III
(74) *Attorney, Agent, or Firm* — Volpe Koenig (57) ABSTRACT

The disclosure provides a mobile terminal. A device housing of the mobile terminal includes a light-permeable portion and an external connection portion whereby an external lens assembly is able to positioned and mounted on an external connection region of the mobile terminal, and can cooperate with an image sensor assembly arranged inside a first assembly space in the device housing to achieve a shooting function.

19 Claims, 7 Drawing Sheets

(56) References Cited

U.S. PATENT DOCUMENTS

| | | | |
|---|---|---|---|
| 2020/0169651 A1* | 5/2020 | Hung | H04N 23/66 |
| 2021/0064099 A1* | 3/2021 | Yang | G03B 17/04 |
| 2021/0368079 A1* | 11/2021 | Birnbaum | G02B 7/09 |
| 2023/0208955 A1* | 6/2023 | Yang | H04M 1/0264 |
| | | | 455/556.1 |

* cited by examiner

MOBILE TERMINAL AND MOBILE DEVICE

CROSS REFERENCE TO RELATED APPLICATIONS

The present application claims the benefit of priority to Chinese Patent Application No. 202111640093.0, filed on Dec. 29, 2021, the contents of which are incorporated herein by reference in their entireties for all purpose.

BACKGROUND

Mobile terminals such as mobile phones generally include a built-in camera module to achieve a shooting function. The camera module is integrated in the body of the mobile terminal, including an image sensor, a lens, a focusing module, an anti-shake motor and other main components, so as to obtain a good imaging picture quality in a limited space.

However, in the related art, the structure and size of the built-in camera module of the mobile terminal are limited by the overall size of the mobile terminal. If the overall layout of the mobile terminal is considered, the function and imaging quality of the built-in camera module cannot be improved. If the camera module is too thick, the overall thickness of the mobile terminal may be large, the aesthetics and a use experience may be reduced, and a layout area of a main board of the mobile terminal and installation spaces of other parts such as a battery capacity may also be affected.

SUMMARY

The disclosure relates to the technical field of electronics, and in particular to a mobile terminal and a mobile device.

According to a first aspect of the disclosure, a mobile terminal is provided, including:
- a device housing, including a light-permeable portion and an external connection portion whereby an external lens assembly is able to positioned and mounted on an external connection region of the mobile terminal, where a first assembly space corresponding to the light-permeable portion is arranged inside the device housing, and
- an image sensor assembly arranged inside the first assembly space, and a photosensitive unit of the image sensor assembly corresponds to the external connection region.

According to a second aspect of the disclosure, a mobile device is provided, including: an external lens assembly and a mobile terminal, the mobile terminal comprises a device housing and an image sensor assembly, wherein the device housing comprises a light-permeable portion and an external connection portion whereby an external lens assembly is positioned and mounted on an external connection region of the mobile terminal, wherein a first assembly space corresponding to the light-permeable portion is arranged inside the device housing, the image sensor assembly arranged inside the first assembly space, wherein a photosensitive unit of the image sensor assembly corresponds to the external connection region, and the external lens assembly is detachably assembled with an external connection portion, positioned and mounted on an external connection region of the mobile terminal.

DETAILED DESCRIPTION

The embodiments will be described in detail here, and examples thereof are shown in the accompanying drawings. When the following descriptions refer to the drawings, the same numbers in different drawings indicate the same or similar elements, unless otherwise indicated. The implementation manners described in the following embodiments do not represent all implementation manners consistent with the disclosure. Instead, they are the examples of apparatuses and methods consistent with some aspects of the disclosure.

The terms used in the disclosure are for the purpose of describing specific embodiments, and are not intended to limit the disclosure. Technical or scientific terms used in the disclosure should have the ordinary meanings as understood by those of ordinary skill in the art to which the disclosure belongs, unless otherwise defined. The terms "first", "second" and the like used in the disclosure do not indicate any sequence, quantity or importance, and are used to distinguish between different components. Likewise, the terms "one" or "a/an" and the like do not indicate a limitation of quantity, but rather indicates the presence of at least one, and if only "one" is referred to, it will be stated separately. "A plurality of" or "several" indicates two or more. Unless otherwise indicated, the terms "front", "back", "lower" and/or "upper", "top", "bottom" and the like are used for ease of description and are not limited to one position or one spatial orientation. The terms "comprise" or "include" and the like are intended to indicate that an element or item preceding a "comprise" or an "include" encompasses the elements or items listed following the "comprise" or the "include", and equivalents thereof, but does not exclude another element or item. The terms "connected to" or "in connection with" and the like are not limited to physical or mechanical connections, and may include electrical connections, whether direct or indirect.

Mobile terminals such as mobile phones generally include a built-in camera module to achieve a shooting function. The camera module is integrated in the body of the mobile terminal, including an image sensor, a lens, a focusing module, an anti-shake motor and other main components, so as to obtain a good imaging picture quality in a limited space. However, in the related art, the structure and size of the built-in camera module of the mobile terminal are limited by the overall size of the mobile terminal. If the overall layout of the mobile terminal is considered, the function and imaging quality of the built-in camera module cannot be improved. If the camera module is too thick, the overall thickness of the mobile terminal may be large, the aesthetics and a use experience may be reduced, and a layout area of a main board of the mobile terminal and installation spaces of other components such as a battery capacity may also be affected.

Figure 1:
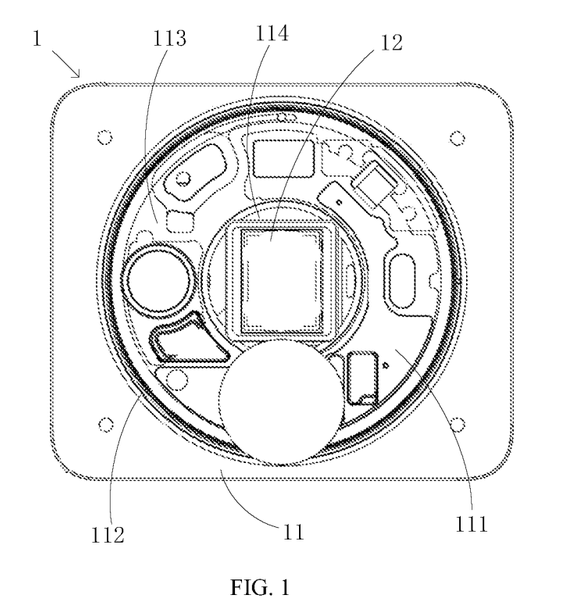
FIG. 1 is a schematic top view structural diagram of a mobile terminal according to an embodiment of the disclosure.

The disclosure provides a mobile terminal, and FIG. 1 is a schematic top view structural diagram of a mobile terminal according to an embodiment of the disclosure. As shown in FIG. 1, the mobile terminal 1 includes a device housing 11 and an image sensor assembly 12. The device housing 11 includes a light-permeable portion 111 and an external connection portion 112. A first assembly space 114 corresponding to the light-permeable portion 111 is arranged in the device housing 11. Through the external connection portion 112, an external lens assembly 2 is capable of being positioned and installed on an external connection region 113 outside the mobile terminal 1. The image sensor assembly 12 is arranged in the first assembly space 114 and a photosensitive unit 121 of the image sensor assembly 12 corresponds to the external connection region 113.

It should be noted that the first assembly space 114 corresponding to the light-permeable portion means that the first assembly space 114 is located in the beneath region of the light-permeable portion 114, or the light-permeable portion 114 may cover the first assembly space 114. As the image sensor assembly 12 is accommodated in the first assembly space 114, the light-permeable portion 111 may cover the area of the image sensor assembly 12, or may cover the area of the photosensitive unit 121 of the image sensor assembly 12, or may cover the image sensor assembly 12 and the peripheral area of the image sensor assembly 12, for example, the area beneath the external connection region 113 to allow the structural devices in the area can be seen through the light-permeable portion 111, and improve the technological sense and aesthetics of the mobile terminal 1. Similarly, the external connection region 113 may cover the area of the photosensitive unit 121 of the image sensor assembly 12, or may cover the area of the image sensor assembly 12, or may cover the image sensor assembly 12 and the peripheral area of the image sensor assembly 12, so that the effective penetration of light is still ensured after the external lens assembly 2 installed.

As the device housing 11 of the mobile terminal 1 includes the light-permeable portion 111 and the external connection portion 112, and through the external connection portion 112, the external lens assembly 2 can be positioned and installed on the external connection region 113 outside the mobile terminal 1. The external lens assembly 2 can cooperate with the image sensor assembly 12 arranged in the first assembly space 114 in the device housing 11 to achieve a shooting function. The external lens assembly 2 is detachably connected to the outside of the mobile terminal 1, such that an occupation of an internal space of the mobile terminal 1 is avoided, and the lightness and thinness of the mobile terminal 1 are improved. The image sensor assembly 12 with a thinner structure built in the mobile terminal 1 is helpful to enlarge an imaging size of the image sensor assembly 12 to achieve an outsole imaging and obtain half-frame and full-frame images. The image sensor assembly 12 can achieve functions of a high computing power image processing, an editing and a sharing with the help of a platform of the mobile terminal 1, and cooperates with the external lens assembly 2 to achieve a good shooting effect.

In addition, since the external lens assembly 2 does not occupy the internal space of the mobile terminal 1, and a main board of the mobile terminal 1 is no longer limited by a lens size, an improved layout area can be obtained, and a heat dispersion effect and the integrity of a transmitted signal can be improved. Moreover, the internal space of the mobile terminal 1 saved by externally connecting the lens can also be used to improve a battery capacity and increase the endurance of the mobile terminal 1.

A distance from the photosensitive main body 121 of the image sensor assembly 12 to the light-permeable portion 111 of the device housing 11 is relatively small, and the distance can be less than or equal to 10 mm, so that almost all common lenses in the market can be adapted, and make one mobile terminal 1 adapted to various lenses, so that the photographing experience of a photography enthusiast is improved. Traditional lens can also rely on the above mobile terminal 1 to play a role, and the mobile terminal 1 can also serve as a professional photography tool in addition to having a communication function, and has higher value.

It should be noted that the mobile terminal 1 may be a mobile phone, a tablet computer, a wearable device, etc., which is not limited by the disclosure. For example, the mobile terminal 1 is a mobile phone, the mobile phone has a high computing power platform, high-efficiency and high-quality image algorithms, and convenient editing and sharing functions. After collecting light through the external lens assembly 2 and imaging through the image sensor assembly 12, the mobile phone can be directly used to perform image processing, editing and sharing, so that a convenient image system is obtained, and a process is avoided that when a camera with a high imaging quality is separately used, an image needs to be transferred out and then processed, edited and shared.

For example, in scenarios such as traveling, professional photography, and interview video recording, it is no longer necessary to carry a heavy camera body other than a camera lens for daily use. It is only necessary to install the camera lens on the mobile terminal 1 for use, and disassemble the camera lens after use, so that the portability and convenience of use are improved.

Since selection of the external lens assembly 2 is no longer limited by an assembly space of the mobile terminal 1, the external lens 22 can match the imaging size of the image sensor assembly 12 to the maximum extent, and many performances such as an aperture, a light inlet amount, and resolution power can be improved. For example, when shooting in dark scenarios such as a night, a dark room, a cave, and a tunnel, the external lens 22 with a large diameter and aperture can be selected, and an exposure and a fusion algorithms of the mobile terminal 1 can be combined to obtain good dark state scenario photos and improve the user experience.

In another example, the photography enthusiast can externally connect, according to a shooting scenario and a shooting need, a lens of a single-lens reflex camera, a micro-single digital camera or a film camera, such as a telephoto portrait lens, an extra-wide angle landscape lens, a large aperture lens, a cinema lens. The above external lens 22 is combined with the image sensor assembly 12 built in the mobile terminal 1 to complete functions such as taking pictures and videos, thus improving the quality of pictures and videos. The above mobile terminal 1 can further be externally connected to some old lenses with difficult field distance matching collected by the photography enthusiast, so that the practicability of the old lenses is improved.

Because the image sensor assembly 12 of the mobile terminal 1 is smaller than an image sensor of a traditional camera, when the mobile terminal 1 adapts to the external lens 22 with different specifications, an equivalent conversion needs to be performed on a lens focal length. For example, the size of the image sensor assembly 12 of the mobile terminal 1 is 1 inch, and a diagonal line length ratio of the image sensor of a full-frame camera to the image sensor assembly 12 of the mobile terminal in the disclosure is 43.27/16=2.7, and 2.7 is the focal length conversion coefficient of the external lens 22 of the full-frame camera. When using a full-frame 50 mm focal length external lens 22, an equivalent focal length is 50 mm*2.7=135 mm. Similarly, for an APS-C camera lens, the focal length conversion coefficient is 28.3/16=1.77. For a ⅔-inch camera lens, the focal length conversion coefficient is 22.4/16=1.4. According to the above focal length conversion coefficients, the corresponding external lens 22 can be selected according to a shooting scenario.

Figure 2:
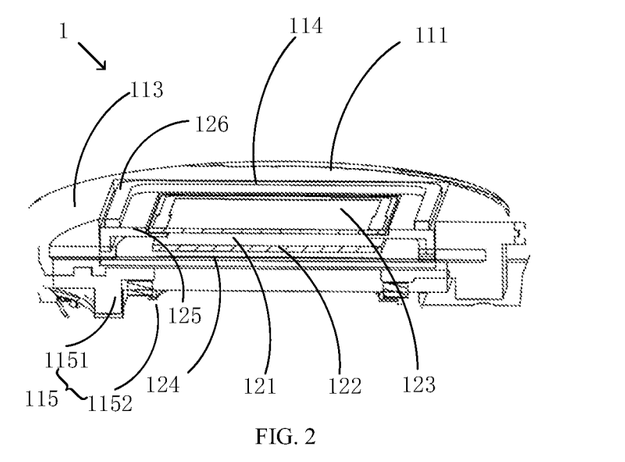
FIG. 2 is a schematic partial sectional structural diagram of a mobile terminal shown in an embodiment of the disclosure.

In some embodiments, as shown in FIG. 2, the device housing 11 may include a first bracket 115. The first bracket 115 includes a bracket body 1151 and a first accommodation space 1152 surrounded by the bracket body 1151, and the image sensor assembly 12 is assembled in the first accommodation space. The image sensor assembly 12 is assembled and fixed by the first bracket 115, improving the installation convenience, stability and structural reliability of the image sensor assembly 12.

It should be noted that the first accommodating space 1152 may be smaller than or equal to the first assembly space 114. For example, in an embodiment including the first bracket 115 in FIG. 2, the first bracket 115 is accommodated in the first assembly space 114, and the first accommodation space 1152 surrounded by the bracket body 1151 for assembling the image sensor module 12. In this case, the first accommodating space 1152 is smaller than the first assembling space 114. In some other embodiments, in an embodiment that does not include the first bracket 115, the image sensor assembly 12 can be directly assembled in the first assembly space 114. In this case, it can be considered that the first accommodating space 1152 is equivalent to the assembly spaces 114 are equal.

In the above embodiment, the bracket body 1151 may include a heat dissipation structure, and at least a part of the image sensor assembly 12 is in a contacting fit with the heat dissipation structure. The heat dissipation function of the image sensor assembly 12 is achieved by the bracket body 1151, so that the first bracket 115 not only has a function of supporting and assembling, but also has the heat dissipation function for the image sensor assembly 12.

It should be noted that, the heat dissipation structure may be made of a metal material to export heat from the image sensor assembly 12 through contact between the metal material and the image sensor assembly 12 and another peripheral metal member. The bracket body 1151 may be molded by injection molding to obtain a structure including a metal and a plastic material.

Figure 3:
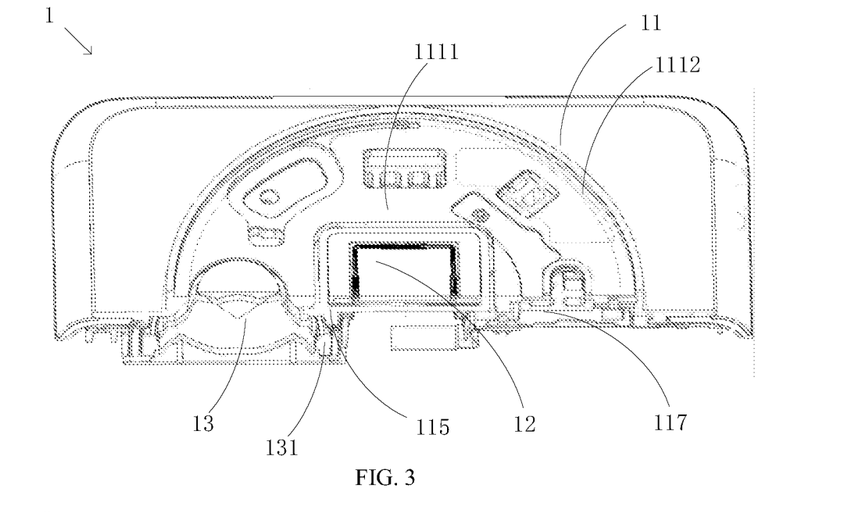
FIG. 3 is a schematic partial sectional structural diagram of a mobile terminal shown in another embodiment of the disclosure.
Figure 4:
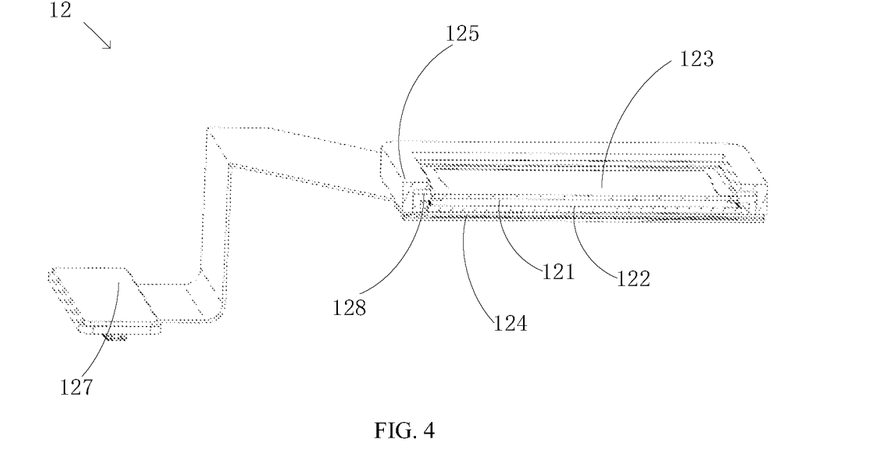
FIG. 4 a schematic partial sectional structural diagram of an image sensor assembly according to an embodiment of the disclosure.

In some embodiments, as shown in FIGS. 2 to 4, the image sensor assembly 12 may include an optical filter 123, a sensor body 122, and a circuit board 124. The optical filter 123 is arranged above the sensor body 122 and covers a photosensitive unit 121 of the sensor body 122, the circuit board 124 is arranged below the sensor body 122. The optical filter 123 may be supported by a third bracket 128 to improve the assembly stability thereof.

When the image sensor assembly 12 is assembled in the first accommodation space 1152 of the first bracket 115, the heat dissipation structure may be located at the bottom of the bracket body 1151, so that the circuit board 124 of the image sensor assembly 12 may be in direct contact with the heat dissipation structure, thereby achieving the heat dissipation function to the image sensor assembly 12.

As the optical filter 123 covers the photosensitive unit 121 of the sensor body 122, the optical filter 123 can be visually seen through the light-permeable portion 111, improving the science and technology feeling and aesthetics of the mobile terminal 1.

In some embodiments, the image sensor assembly 12 may further include a protective cover 125 and a sealing member 126. The protective cover 125 covers edge regions of the optical filter 123, the sensor body 122 and the circuit board 124. The light-permeable portion 111 includes a light-permeable portion body 1111 and a light-permeable cover plate 1112. The sealing member 126 is arranged at an edge region between the light-permeable cover plate 1112 and the protective cover 125, and is respectively in a sealing fit with the light-permeable cover plate 1112 and the protective cover 125. The protective cover 125 can protect the image sensor assembly 12, and prevent same from moving or damage due to the shaking or collision of the mobile terminal 1 during use. The protective cover 125 can also cooperate with the sealing member 126 to seal the image sensor assembly 12 to prevent dust, impurities or liquid from entering the image sensor assembly 12 and affecting imaging.

It should be noted that, the above sealing member 126 may be a foam, a double-sided adhesive, a sealant, or a silicone pad, which is not limited by the disclosure. In addition, light leakage can be prevented by silkscreen at the contact region of the third bracket 128 and the optical filter 123, so that ghost and flare are avoided.

In the above embodiment, the size of the photosensitive unit 121 of the image sensor assembly 12 is greater than or equal to 16 mm, so as to obtain an outsole imaging effect.

In some embodiments, when the mobile terminal 1 includes a built-in camera module, the first bracket 115 may be assembled on a second bracket 131 supporting the built-in camera module to make the second bracket 131 support the first bracket 115, thereby improving the structural stability of the first bracket 115.

In the above embodiment, a example installation process of the mobile terminal 1 may be implemented by the following steps: firstly a connector 127 of the image sensor assembly 12 is buckled on a top surface of the main board of the mobile terminal 1, and the connector 127 is installed in a middle frame 116 together with the main board. Then, the head of the image sensor assembly 12 passes through the second bracket 131, and the connector 127 of the built-in camera module is buckled to the main board, and then an antenna cover 117 is assembled, and is fixed by locking screws. Next, the first bracket 115 is assembled on the second bracket 131, the image sensor assembly 12 is fixed in the first accommodation space 1152 of the first bracket 115, all protective films are torn off, and the mobile terminal 1 is covered with an integrated back housing, and the integrated back housing may include a decorative cover plate 14 and a battery cover. Finally, the battery cover is subjected to pressure maintaining and then enters a testing station for testing.

In some other embodiments, the mobile terminal 1 further includes the antenna cover 117, the first bracket 115 and the antenna cover 117 are integrally formed to support the image sensor assembly 12 through the original antenna cover 117 of the mobile terminal 1. Thereby simplifying an internal structure of the mobile terminal 1, and improving the assembly convenience and use reliability of the first bracket 115.

Figure 5:
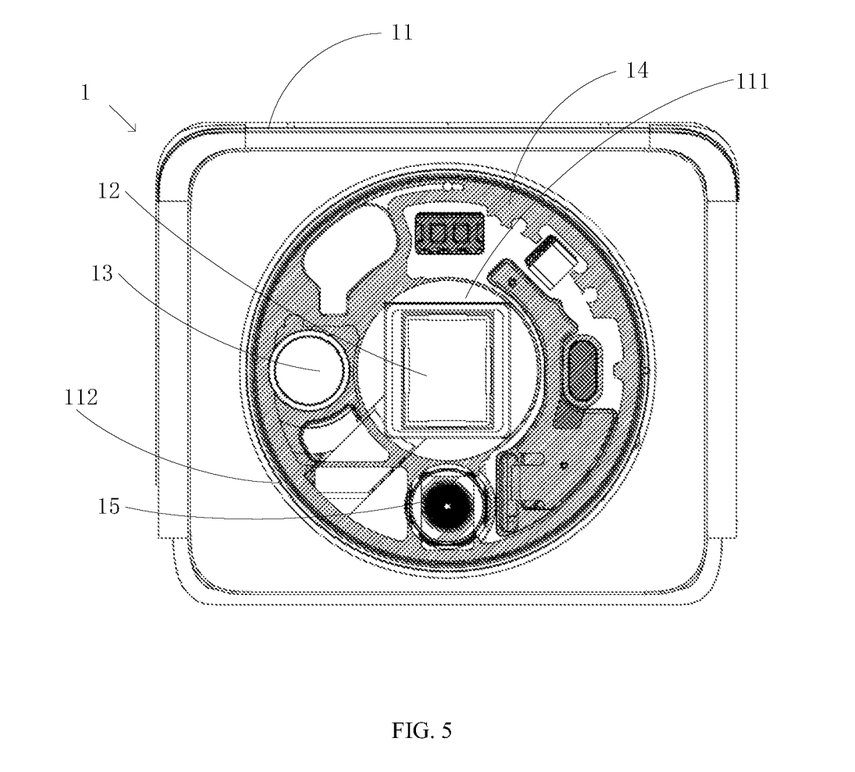
FIG. 5 is a schematic top view structural diagram of a mobile terminal according to another embodiment of the disclosure.
Figure 6:
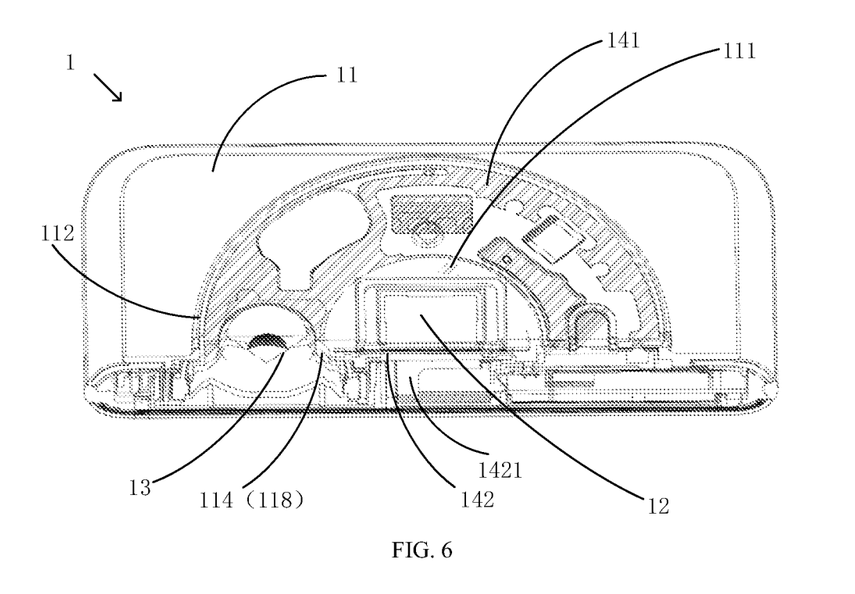
FIG. 6 is a schematic partial sectional structural diagram of a mobile terminal shown in a further embodiment of the disclosure.
Figure 7:
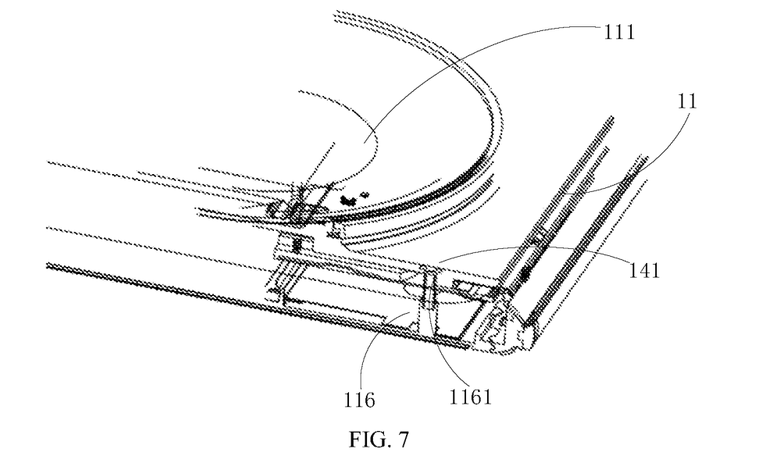
FIG. 7 is a schematic partial sectional structural diagram of a mobile terminal shown in still another embodiment of the disclosure.
Figure 8:
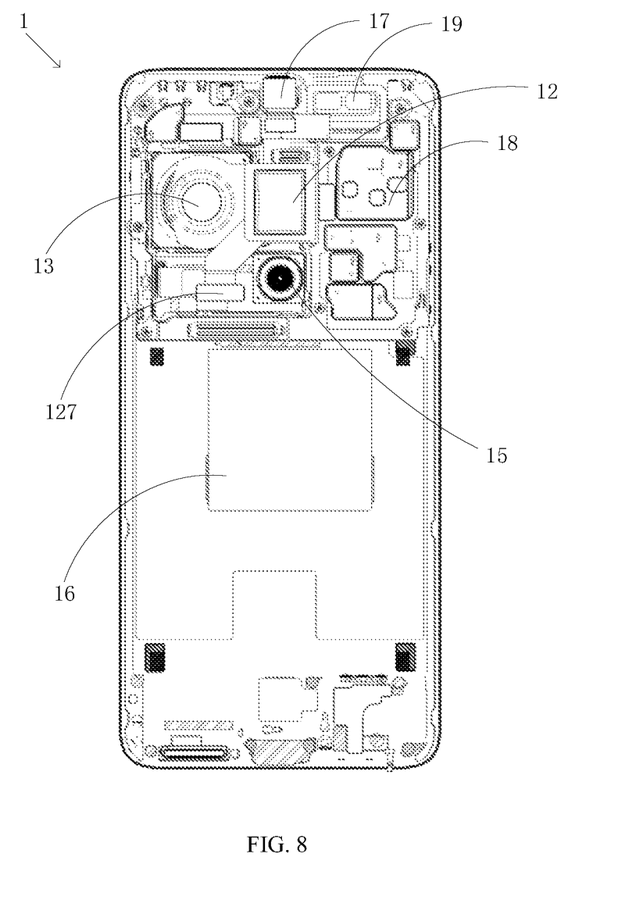
FIG. 8 is a schematic perspective structural diagram of a mobile terminal according to an embodiment of the disclosure.
Figure 9:
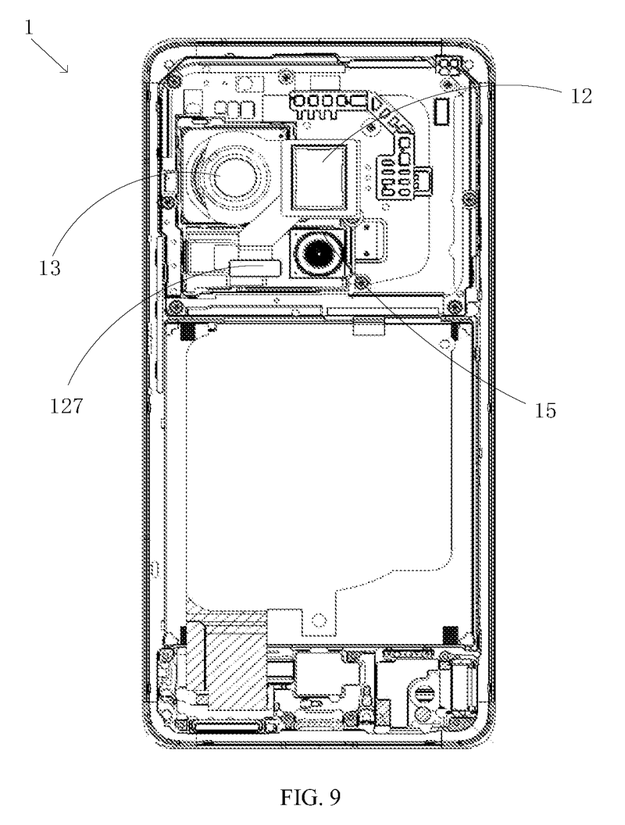
FIG. 9 is a schematic perspective structural diagram of a mobile terminal according to another embodiment of the disclosure.
Figure 10:
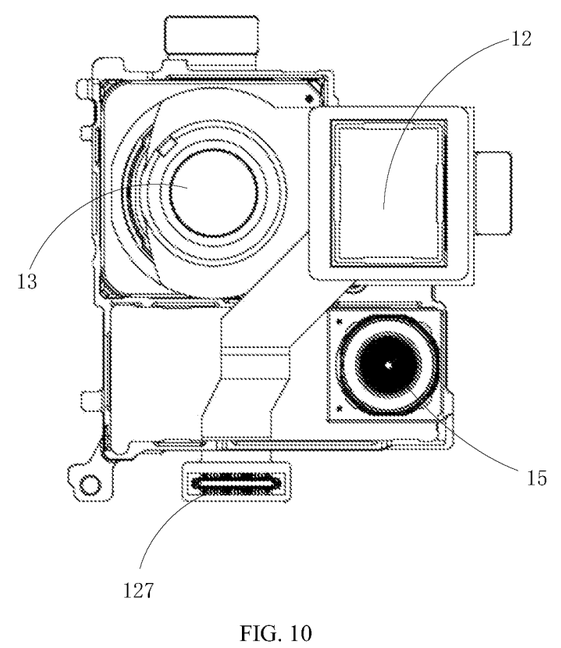
FIG. 10 is a schematic distribution structural diagram of main camera assembly, an extra-wide angle camera assembly, and an image sensor assembly according to an embodiment of the disclosure.

In some embodiments, as shown in FIGS. 5 to 7, the device housing 11 includes a middle frame 116 and a decorative cover plate 14 assembled in the middle frame 116, and the external connection portion 112 is arranged on the decorative cover plate 14. The decorative cover plate 14 can be used to decorate the light-permeable portion 111 to improve the external aesthetics of the mobile terminal 1 having the image sensor assembly 12. The external connection portion 112 is arranged on the decorative cover plate 14, so that the external aesthetics of the device housing 11 can be improved, and the connection strength between the external connection portion 112 and the external lens assembly 2 can also be improved.

In some embodiments, the image sensor assembly 12 may be assembled and fixed with the decorative cover plate 14 to assemble the image sensor assembly 12 through the decorative cover plate 14, thereby improving the alignment precision of the image sensor assembly 12 and an optical axis of the external lens 22.

The above decorative cover plate 14 may include a cover plate body 141 and an installing structure 142, the cover plate body 141 is arranged at a periphery of the light-permeable portion 111 and covers at least a part of the structure of the mobile terminal 1. The installing structure 142 surrounds and forms a second accommodation space 1421 inside the mobile terminal 1, and the image sensor assembly 12 is assembled in the second accommodation space. 1421 By means of the above structure, an alignment dimension chain between the image sensor assembly 12 and the external lens 22 can be shortened and the alignment precision of the image sensor assembly 12 and the optical axis of the external lens 22 can be improved. Further, the structure of the mobile terminal 1 can be simplified by using the structure of the existed decorative cover plate 14 of the mobile terminal 1.

As shown in FIG. 7, the mobile terminal 1 may further include a plurality of threaded connection members 1161. The decorative cover plate 14 and the middle frame 116 are fixed by using the threaded connection members 1161 to improve the structural strength of the decorative cover plate 14 and provide a reliable structural basis for installation of the external lens assembly 2. For example, four corners of the decorative cover plate 14 may be respectively provided with the threaded connection member 1161 to be fixed with the middle frame 116 through the threaded connection member 1161.

In the above embodiment, the example installation process of the mobile terminal 1 may be implemented by the following steps: firstly, the connector 127 of the image sensor assembly 12 is buckled on the top surface of the main board, and the connector 127 is installed in the middle frame 116 together with the main board. Then, the head of the image sensor assembly 12 passes through the second bracket 131, and the connector 127 of the built-in camera module is buckled to the main board. Then, the rear antenna cover 117 is assembled, and is fixed by locking screws, and a protective film of the built-in camera module is taken off. Finally, the image sensor assembly 12 is fixed in the second accommodation space of the decorative cover plate 14, a protective film of the image sensor assembly 12 is taken off, the battery cover with the decorative cover plate 14 is preliminarily fixed on the middle frame 116, a lens of the decorative cover plate 14 is assembled to the decorative cover plate 14, and the lens and the battery cover are subjected to pressure maintaining and then enter the test station for testing.

In the above embodiment, the external connection portion 112 may include at least one of a clamping structure, a threaded connection structure and a magnetic connection structure arranged in the device housing 11, so as to achieve disassembly and assembly convenience of the external lens 22 by means of a detachable connection between the external connection portion 112 and the external lens assembly 2.

In some embodiments, the mobile terminal 1 may further include a decorative cover body assembled outside the device housing 11, and the decorative cover body covers at least one of the light-permeable portion 111 and the external connection portion 112 to shield the light-permeable portion 111 and/or the external portion 112 when the external lens assembly 2 is not installed, thereby improving the overall aesthetics of the mobile terminal 1.

In some embodiments, as shown in FIGS. 6 to 10, the mobile terminal 1 may further include at least one of a main camera module 13 and an extra-wide angle camera module 15, the device housing 11 is provided with a second assembly space 118, and the main camera module 13 and/or the extra-wide angle camera module 15 are fixedly assembled in the second assembly space 118. During daily use, the main camera module 13 and the extra-wide angle camera module 15 can achieve a single camera shooting function such as code scanning, simple photographing, and the dual-camera portrait mode function can also be completed.

It should be noted that the size of the photosensitive unit 121 of an image sensor of the main camera module 13 and/or the extra-wide angle camera module 15 may be greater than or equal to 1 inch to improve an imaging effect of the built-in camera module of the mobile terminal 1. When the size of the photosensitive main body 121 of the main camera module 13 and the image sensor assembly 12 is 1 inch, an imaging quality is improved, layout placement of the camera module is facilitated, and the space utilization rate is improved.

In the above embodiment, in a thickness direction of the mobile terminal 1, a height section of the image sensor assembly 12 is different from that of at least one of the main camera module 13 and the extra-wide angle camera module 15, so as to avoid structural interference between the image sensor assembly 12 and the main camera module 13 and/or the extra-wide angle camera module 15 and improve the utilization rate of the internal space of the mobile terminal 1.

In a perpendicular to the thickness direction of the mobile terminal 1, the main camera module 13 and the extra-wide angle camera module 15 can be arranged on two sides of the image sensor assembly 12, so as to facilitate the lighting of the image sensor assembly 12 and improve the layout aesthetics of an imaging structure. The main camera module 13 and the extra-wide angle camera module 15 can be arranged on two sides of the image sensor assembly 12, and the two sides can refer to any two sides of the image sensor assembly 12. For example, the main camera module 13 can be arranged on the left side of the image sensor assembly 12, and the extra-wide angle camera module 15 can be arranged on the lower side of the image sensor assembly 12.

The main camera module 13, the extra-wide angle camera module 15 and the image sensor assembly 12 adopt the above layout to optimize the internal structure of the mobile terminal 1, and increase an installation space of functional modules such as a battery 16, an earpiece assembly 19, a main board processor 18 and a front camera module 17.

The light-permeable portion 111 can cover the second assembly space 118, and the first assembly space 114 is communicated with the second assembly space 118. That is, the main camera module 13 and/or the extra-wide angle camera module 15 and the image sensor assembly 12 may be arranged in the same space, and the above main camera module 13 and/or the extra-wide angle camera module 15 and the image sensor assembly 12 all obtain light through the light-permeable portion 111, so as to simplify the structural arrangement of the mobile terminal 1 and improve the aesthetics of the mobile terminal 1.

Figure 11:
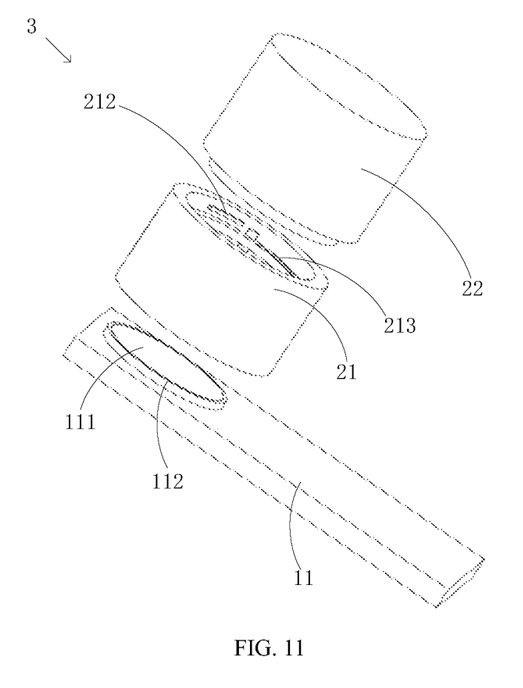
FIG. 11 is a schematic exploded structural diagram of a mobile device according to an embodiment of the disclosure.
Figure 12:
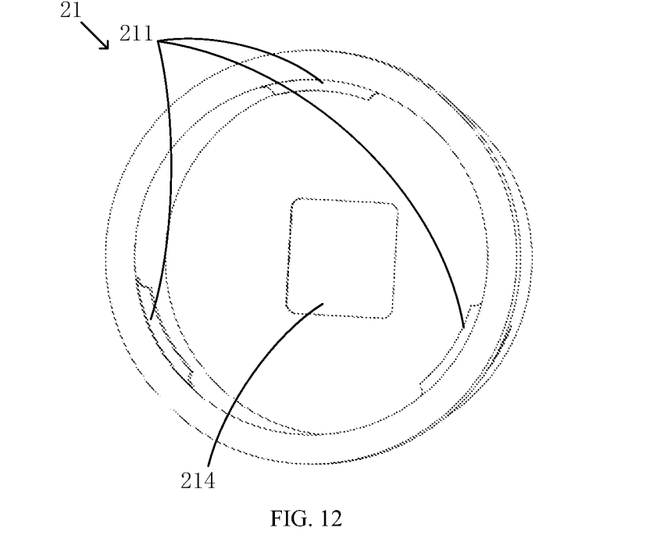
FIG. 12 is a schematic perspective structural diagram of an adapter according to an embodiment of the disclosure.

The disclosure further provides a mobile device 3, as shown in FIGS. 11 and 12, the mobile device 3 includes an external lens assembly 2 and a mobile terminal according to any embodiment of above, where the external lens assembly 2 is detachably assembled with the external connection portion 112, to be positioned and installed on the external connection region 113 of the mobile terminal 1.

As the device housing 11 of the mobile terminal 1 includes the light-permeable portion 111 and the external connection portion 112, and through the external connection portion 112, the external lens assembly 2 can be positioned and installed on the external connection region 113 outside the mobile terminal 1, and the external lens assembly 2 can cooperate with the image sensor assembly 12 arranged in the first assembly space 114 in the device housing 11 to achieve a shooting function. Since the external lens assembly 2 is detachably connected to the outside of the mobile terminal 1, such that an occupation of an internal space of the mobile terminal 1 is avoided, and the lightness and thinness of the mobile terminal 1 are improved. The image sensor assembly 12 with a thinner structure built in the mobile terminal 1 is helpful to enlarge an imaging size of the image sensor assembly 12 to achieve an outsole imaging, and can achieve functions of a high computing power image processing, an editing and a sharing with the help of a platform of the mobile terminal 1, and cooperates with the external lens assembly 2 to achieve a good shooting effect.

In some embodiments, the external lens assembly 2 includes an external lens 22 and an adapter 21, the adapter 21 is detachably connected to the external lens 22 and the mobile terminal 1 respectively. The adapter 21 includes a first positioning connection end 211 and a second positioning connection end 212 communicated with each other. The first positioning connection end 211 being positioned and connected to the external connection portion 112, and the second positioning connection end 212 being positioned and connected to the external lens 22. Thus, the distance from the surface of a photosensitive main 121 of the image sensor assembly 12 to an access plane of the external lens 22 is equal to a flange focal distance of the external lens 22.

A plurality of second positioning connection ends 212 matching a flange focal distance of different external lenses 22 may be provided for the adapter 21, so that the external lenses 22 having different flange focal distances can be installed to the mobile terminal 1 and can focus and be used normally. A corresponding adapter 21 may also be provided for different external lenses 22, so that the second positioning connection end 212 of each adapter 21 is positioned and connected to the external lens 22 to obtain a flange focal distance matching the external lens 22.

In the above embodiment, the adapter 21 includes a first conductive contact and a second conductive contact 213, the first conductive contact being electrically connected to a main board of the mobile terminal 1, and the second conductive contact 213 being electrically connected to the external lens 22. The external lens 22 may include functions such as automatic focusing, anti-shake. After the mobile terminal 1 and the external lens 22 are electrically connected through the adapter 21, a control signal or a feedback signal may be transmitted to each other, so as to achieve focusing and anti-shake by using functions such as automatic focusing and anti-shake of the external lens 22, thereby improving the focusing and anti-shake effects of the mobile terminal 1.

The adapter 21 may include a light-permeable opening 214 in a fit with the light-permeable portion 111, the light-permeable opening 214 matching the photosensitive unit 121 of the image sensor assembly 12 in structural shape and size. The light-permeable opening 214 of the adapter 21 can transmit the light passing through the external lens 22 to the photosensitive unit 121 of the image sensor assembly 12 through the light-permeable opening 214, and the light-permeable opening 214 matches the photosensitive unit 121 in structural shape and size to prevent external scatter light from entering the image sensor assembly 12 to affect the imaging effect. For example, when the photosensitive unit 121 is rectangular, the light-permeable opening 214 may be rectangular matching the photosensitive unit 121, such that after the external lens 22 is assembled to the mobile terminal 1, the photosensitive unit 121 obtain better lighting and imaging effects.

Figure 13:
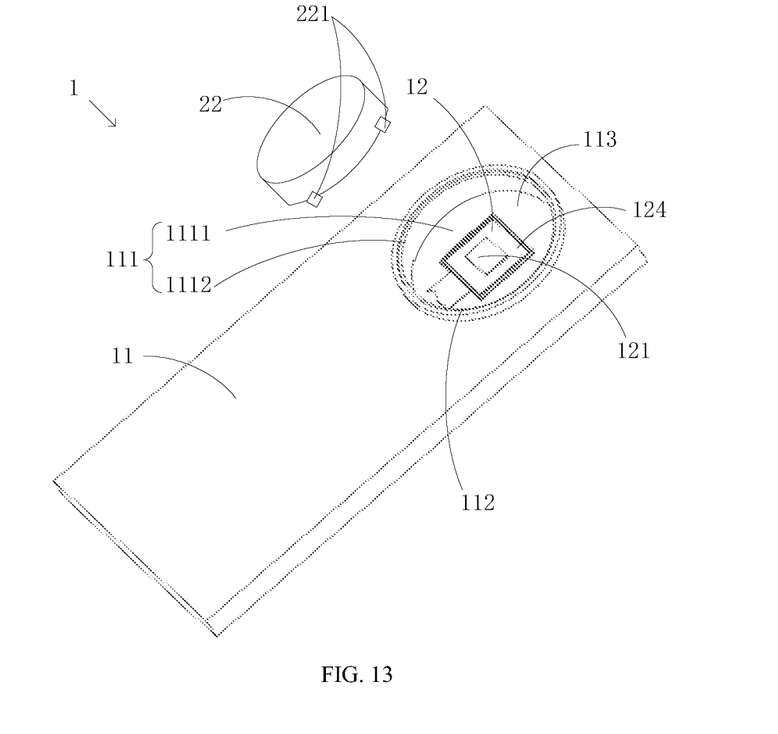
FIG. 13 is a schematic exploded structural diagram of a mobile device according to another embodiment of the disclosure.

In some other embodiments, as shown in FIG. 13, the external lens assembly 2 may only include the external lens 22, and the external lens 22 is provided with a connection structure 221 detachably connected to the external connection portion 112 to achieve an assembly of the external lens 22 and the mobile terminal 1.

The above are only preferred embodiments of the disclosure and are not intended to limit the disclosure, and any modifications, equivalent substitutions, improvements and the like made within the spirit and principle of the disclosure shall fall within the protection scope of the disclosure.

Embodiments

A first embodiment includes a mobile terminal, including
a device housing, comprising a light-permeable portion and an external connection portion whereby an external lens assembly is able to positioned and mounted on the external connection region of the mobile terminal, wherein a first assembly space corresponding to the light-permeable portion is arranged inside the device housing, and
an image sensor assembly arranged inside the first assembly space, wherein a photosensitive unit of the image sensor assembly corresponds to the external connection region.

A second embodiment includes the mobile terminal of embodiment 1, where the device housing comprises a first bracket comprising a bracket body and a first accommodation space surrounded by the bracket body, and the image sensor assembly is assembled in the first accommodation space.

A third embodiment includes the mobile terminal of embodiment 1, where he bracket main body comprises a heat dissipation structure, and at least a part of the image sensor assembly is in a contacting fit with the heat dissipation structure.

A fourth embodiment includes the mobile terminal of embodiment 2, where the mobile terminal further comprises an antenna cover integrally formed with the first bracket.

A fifth embodiment includes the mobile terminal of embodiment 1, where the device housing comprises a middle frame and a decorative cover plate assembled in the middle frame, and the external connection portion is arranged on the decorative cover plate.

A sixth embodiment includes the mobile terminal of embodiment 5, where the image sensor assembly is assembled and fixed with the decorative cover plate.

A seventh embodiment includes the mobile terminal of embodiment 6, where the decorative cover plate comprises a cover plate body and an installing structure, wherein the cover plate body is arranged at a periphery of the light-permeable portion and covers at least a part of the mobile terminal, and the installing structure surrounds and forms a second accommodation space inside the mobile terminal, wherein the image sensor assembly is assembled in the second accommodation space.

An eighth embodiment includes the mobile terminal of embodiment 5, where the mobile terminal further comprises a plurality of threaded connection members, the decorative cover plate and the middle frame are fixed by the threaded connection members.

A ninth embodiment includes the mobile terminal of embodiment 1, where the image sensor assembly comprises an optical filter, a sensor body, and a circuit board, wherein the optical filter is arranged above the sensor body and covers the photosensitive unit of the sensor body, and the circuit board is arranged below the sensor body.

A tenth embodiment includes the mobile terminal of embodiment 9, where the image sensor assembly further comprises a protective cover and a sealing member, wherein the protective cover covers edge regions of the optical filter, the sensor body and the circuit board; the light-permeable portion comprises a light-permeable cover plate, wherein the sealing member is arranged at an edge region between the light-permeable cover plate and the protective cover, and is respectively in a sealing fit with the light-permeable cover plate and the protective cover.

An eleventh embodiment includes the mobile terminal of embodiment 1, where the size of the photosensitive unit of the image sensor assembly is greater than or equal to 16 mm.

A twelfth embodiment includes the mobile terminal of embodiment 1, where the external connection portion comprises at least one of a clamping structure, a threaded connection structure and a magnetic connection structure arranged in the device housing.

A thirteenth embodiment includes the mobile terminal of embodiment 1, where the mobile terminal further comprises a decorative cover body assembled outside the device housing and covering the light-permeable portion and/or the external connection portion.

A fourteenth embodiment includes the mobile terminal of embodiment 1, where the mobile terminal further comprises a main camera module and/or an extra-wide angle camera module, and the device housing is provided with a second assembly space, the main camera module and/or the extra-wide angle camera module being fixedly assembled in the second assembly space.

A fifteenth embodiment includes the mobile terminal of embodiment 14, where in a thickness direction of the mobile terminal, a height section of the image sensor assembly is different from a height section of the main camera module and/or the extra-wide angle camera module,
- and/or, in a direction perpendicular to the thickness direction of the mobile terminal, the main camera module and the extra-wide angle camera module are arranged on two sides of the image sensor assembly,
- and/or, the light-permeable portion covers the second assembly space, and the first assembly space is communicated with the second assembly space.

A sixteenth embodiment includes mobile device, including: an external lens assembly and the mobile terminal according to any one of embodiment 1 to 15, the external lens assembly is detachably assembled with an external connection portion, to be positioned and installed on an external connection region of the mobile terminal.

A seventeenth embodiment includes the mobile terminal of embodiment 14, where the external lens assembly comprises an external lens and an adapter, wherein the adapter is detachably connected to the external lens and the mobile terminal respectively, and the adapter comprises a first positioning connection end positioned and connected to the external connection portion and a second positioning connection end positioned and connected to the external lens, wherein the first positioning connection end and the second positioning connection end are communicated with each other, and a distance from the surface of the photosensitive unit of the image sensor assembly to an access plane of the external lens is equal to a flange focal distance of the external lens,
- and/or, the adapter comprises a first conductive contact and a second conductive contact, the first conductive contact being electrically connected to a main board of the mobile terminal, and the second conductive contact being electrically connected to the external lens,
- and/or, the adapter comprises a light-permeable opening matched with the light-permeable portion, the light-permeable opening matching the photosensitive unit of the image sensor assembly in structural shape and size.

What is claimed is:

1. A mobile terminal, comprising:
a device housing, comprising a light-permeable portion and an external connection portion whereby an external lens assembly is able to positioned and mounted on the external connection region of the mobile terminal, wherein a first assembly space corresponding to the light-permeable portion is arranged inside the device housing, the device housing comprises a middle frame and a decorative cover plate assembled in the middle frame, and the external connection portion is arranged on the decorative cover plate, and
an image sensor assembly arranged inside the first assembly space, wherein a photosensitive unit of the image sensor assembly corresponds to the external connection region.

2. The mobile terminal according to claim 1, wherein the device housing comprises a first bracket comprising a bracket body and a first accommodation space surrounded by the bracket body, and the image sensor assembly is assembled in the first accommodation space.

3. The mobile terminal according to claim 2, wherein the bracket body comprises a heat dissipation structure, and at least a part of the image sensor assembly is in a contacting fit with the heat dissipation structure.

4. The mobile terminal according to claim 2, wherein the mobile terminal further comprises an antenna cover integrally formed with the first bracket.

5. The mobile terminal according to claim 1, wherein the image sensor assembly is assembled and fixed with the decorative cover plate.

6. The mobile terminal according to claim 5, wherein the decorative cover plate comprises a cover plate body and an installing structure, wherein the cover plate body is arranged at a periphery of the light-permeable portion and covers at least a part of the mobile terminal, and the installing structure surrounds and forms a second accommodation space inside the mobile terminal, wherein the image sensor assembly is assembled in the second accommodation space.

7. The mobile terminal according to claim 1, wherein the mobile terminal further comprises a plurality of threaded connection members, the decorative cover plate and the middle frame are fixed by the threaded connection members.

8. The mobile terminal according to claim 1, wherein
the image sensor assembly comprises an optical filter, a sensor body, and a circuit board,
the optical filter is arranged above the sensor body and covers the photosensitive unit of the sensor body, and
the circuit board is arranged below the sensor body.

9. The mobile terminal according to claim 8, wherein
the image sensor assembly further comprises a protective cover and a sealing member,
the protective cover covers edge regions of the optical filter, the sensor body and the circuit board,
the light-permeable portion comprises a light-permeable cover plate, and
the sealing member is arranged at an edge region between the light-permeable cover plate and the protective cover, and is respectively in a sealing fit with the light-permeable cover plate and the protective cover.

10. The mobile terminal according to claim 1, wherein the size of the photosensitive unit of the image sensor assembly is greater than or equal to 16 mm.

11. The mobile terminal according to claim 1, wherein the external connection portion comprises at least one of a clamping structure, a threaded connection structure and a magnetic connection structure arranged in the device housing.

12. The mobile terminal according to claim 1, wherein the mobile terminal further comprises a decorative cover body assembled outside the device housing and covering at least one of the light-permeable portion and the external connection portion.

13. The mobile terminal according to claim 1, wherein the mobile terminal further comprises at least one of a main camera module and an extra-wide angle camera module, and the device housing is provided with a second assembly space, at least one of the main camera module and the extra-wide angle camera module being fixedly assembled in the second assembly space.

14. The mobile terminal according to claim 13, wherein in a thickness direction of the mobile terminal, a height section of the image sensor assembly is different from a height section of at least one of the main camera module and the extra-wide angle camera module.

15. The mobile terminal according to claim 13, wherein in a direction perpendicular to the thickness direction of the mobile terminal, the main camera module and the extra-wide angle camera module are arranged on two sides of the image sensor assembly.

16. The mobile terminal according to claim 13, wherein the light-permeable portion covers the second assembly space, and the first assembly space is communicated with the second assembly space.

17. A mobile device, comprising:
an external lens assembly, and
a mobile terminal, the mobile terminal comprises a device housing and an image sensor assembly,
wherein the device housing comprises a light-permeable portion and an external connection portion whereby an external lens assembly is positioned and installed on an external connection region outside the mobile terminal,
wherein a first assembly space corresponding to the light-permeable portion is arranged in the device housing, the device housing comprises a middle frame and a decorative cover plate assembled in the middle frame, and the external connection portion is arranged on the decorative cover plate, and the image sensor assembly arranged in the first assembly space, and
wherein a photosensitive unit of the image sensor assembly corresponds to the external connection region, and the external lens assembly is detachably assembled with an external connection portion, positioned and installed on an external connection region of the mobile terminal.

18. The mobile device according to claim 17, wherein
the external lens assembly comprises an external lens and an adapter,
the adapter is detachably connected to the external lens and the mobile terminal respectively, and the adapter comprises a first positioning connection end positioned and connected to the external connection portion and a second positioning connection end positioned and connected to the external lens,
the first positioning connection end and the second positioning connection end are communicated with each other, and
a distance from the surface of the photosensitive unit of the image sensor assembly to an access plane of the external lens is equal to a flange focal distance of the external connection lens.

19. The mobile device according to claim 18, wherein the adapter comprises a first conductive contact and a second conductive contact, the first conductive contact being electrically connected to a main board of the mobile terminal, and the second conductive contact being electrically connected to the external lens.

* * * * *

UNITED STATES PATENT AND TRADEMARK OFFICE
CERTIFICATE OF CORRECTION

PATENT NO. : 12,316,795 B2
APPLICATION NO. : 17/752379
DATED : May 27, 2025
INVENTOR(S) : Zongbao Yang et al.

It is certified that error appears in the above-identified patent and that said Letters Patent is hereby corrected as shown below:

On the Title Page
Item (57), under "ABSTRACT", in Column 2, Line 4, delete "is able to" and insert -- is able to be --, therefor.

In the Specification
In Column 1, Line 26, delete "use" and insert -- user --, therefor.
In Column 1, Line 37, delete "is able to" and insert -- is able to be --, therefor.
In Column 2, Line 7, delete "a" and insert -- is a --, therefor.
In Column 3, Line 20, delete "use" and insert -- user --, therefor.
In Column 4, Line 45, delete "that when" and insert -- when --, therefor.
In Column 7, Line 7, delete "maintaining" and insert -- maintenance --, therefor.
In Column 8, Line 14, delete "maintaining" and insert -- maintenance --, therefor.
In Column 9, Line 26, delete "any" and insert -- an --, therefor.
In Column 10, Line 53, delete "is able to" and insert -- is able to be --, therefor.
In Column 11, Line 2, delete "he" and insert -- the--, therefor.
In Column 12, Line 2, delete "where in" and insert -- wherein --, therefor.

In the Claims
In Column 12, Line 47, in Claim 1, delete "is able to" and insert -- is able to be --, therefor.

Signed and Sealed this
Twenty-ninth Day of July, 2025

Coke Morgan Stewart
*Acting Director of the United States Patent and Trademark Office*